United States Patent
Srivastava et al.

(10) Patent No.: US 11,785,509 B2
(45) Date of Patent: Oct. 10, 2023

(54) INTER ACCESS AND MOBILITY MANAGEMENT FUNCTION IDLE MODE MOBILITY OPTIMIZATION

(71) Applicant: Cisco Technology, Inc., San Jose, CA (US)

(72) Inventors: Anal Srivastava, Cupertino, CA (US); Sangram Kishore Lakkaraju, Bangalore (IN)

(73) Assignee: Cisco Technology, Inc., San Jose, CA (US)

( * ) Notice: Subject to any disclaimer, the term of this patent is extended or adjusted under 35 U.S.C. 154(b) by 145 days.

(21) Appl. No.: 17/529,351

(22) Filed: Nov. 18, 2021

(65) Prior Publication Data
US 2023/0156532 A1 May 18, 2023

(51) Int. Cl.
*H04W 36/00* (2009.01)
*H04W 36/08* (2009.01)
(Continued)

(52) U.S. Cl.
CPC ....... *H04W 36/0033* (2013.01); *H04W 36/08* (2013.01); *H04W 60/00* (2013.01); *H04W 60/06* (2013.01); *H04W 68/005* (2013.01)

(58) Field of Classification Search
CPC ... H04W 8/08; H04W 36/0033; H04W 36/08; H04W 60/00; H04W 60/04; H04W 60/06; H04W 68/005; H04W 88/14; H04W 92/24
See application file for complete search history.

(56) References Cited

U.S. PATENT DOCUMENTS

| 2006/0233135 A1 | 10/2006 | Oswal et al. |
| 2011/0176530 A1* | 7/2011 | Vikberg ............ H04W 36/0033 370/338 |

(Continued)

FOREIGN PATENT DOCUMENTS

| EP | 3598812 A1 | 1/2020 |
| WO | 2018174771 A1 | 9/2018 |

OTHER PUBLICATIONS

3rd Generation Partnership Project: Technical Specification Group Services and System Aspects; Study on the security of Access and Mobility Management Function (AMF) re-allocation; (Release 17), 3GPP Standard; 3GPP TR 33.864; No. V0.6.0 Aug. 29, 2021; 64 pages; XP052056359 [retrieved on Aug. 29, 2021].

(Continued)

*Primary Examiner* — Khoa Huynh
(74) *Attorney, Agent, or Firm* — Polsinelli

(57) ABSTRACT

A method is provided for avoiding context transfers by a first Access and Mobility Management Function (AMF) connected to a first gNB to a second AMF when a user equipment (UE) in idle mode moves from the first gNB to a second gNB. The method may include provisioning the first AMF and the second AMF with the same tracking area identity (TAI), the first AMF and the second AMF s being connected to a respective enterprise gNB. The method may also include configuring the 5G packet core network comprising a session management function (SMF) in communications with the first AMF and the second AMF, to avoid transferring a UE context from the first AMF to the second AMF when the user equipment (UE) in the idle mode moves from a first AMF to the second AMF. The UE context remains with the first AMF.

20 Claims, 14 Drawing Sheets

(51) Int. Cl.
*H04W 60/00* (2009.01)
*H04W 60/06* (2009.01)
*H04W 68/00* (2009.01)

(56) References Cited

U.S. PATENT DOCUMENTS

| | | |
|---|---|---|
| 2019/0053086 A1 | 2/2019 | Li et al. |
| 2020/0077356 A1* | 3/2020 | Youn ..................... H04W 68/02 |
| 2021/0029597 A1 | 1/2021 | Xu et al. |
| 2021/0092608 A1 | 3/2021 | Li et al. |
| 2021/0258766 A1 | 8/2021 | Watanabe et al. |
| 2022/0322268 A1* | 10/2022 | Edge ..................... H04W 60/00 |

OTHER PUBLICATIONS

3rd Generation Partnership Project: Technical Specification Group Services and System Aspects; Study on Architecture for Next Generation System (Release 14), 3GPP Standard; Technical Report; 3 GPP TR 23.799; vol. SA WG2, No. V14.0.0, Dec. 16, 2016, 527 pages, XP051295448 [retrieved on Dec. 16, 2016].
International Search Report and Written Opinion on PCT application No. PCT/US2022/079997, dated Mar. 15, 2023, 15 pages.

* cited by examiner

INTER ACCESS AND MOBILITY MANAGEMENT FUNCTION IDLE MODE MOBILITY OPTIMIZATION

DESCRIPTION OF THE RELATED TECHNOLOGY

Fifth-generation (5G) mobile and wireless networks will provide enhanced mobile broadband communications and are intended to deliver a wider range of services and applications as compared to all prior generation mobile and wireless networks. Compared to prior generations of mobile and wireless networks, the 5G architecture is service-based, meaning that wherever suitable, architecture elements are defined as network functions that offer their services to other network functions via common framework interfaces.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not, therefore, to be considered to be limiting of its scope, the principles herein are described and explained with additional specificity and detail through the use of the accompanying drawings in which.

DETAILED DESCRIPTION

Figure 1A:
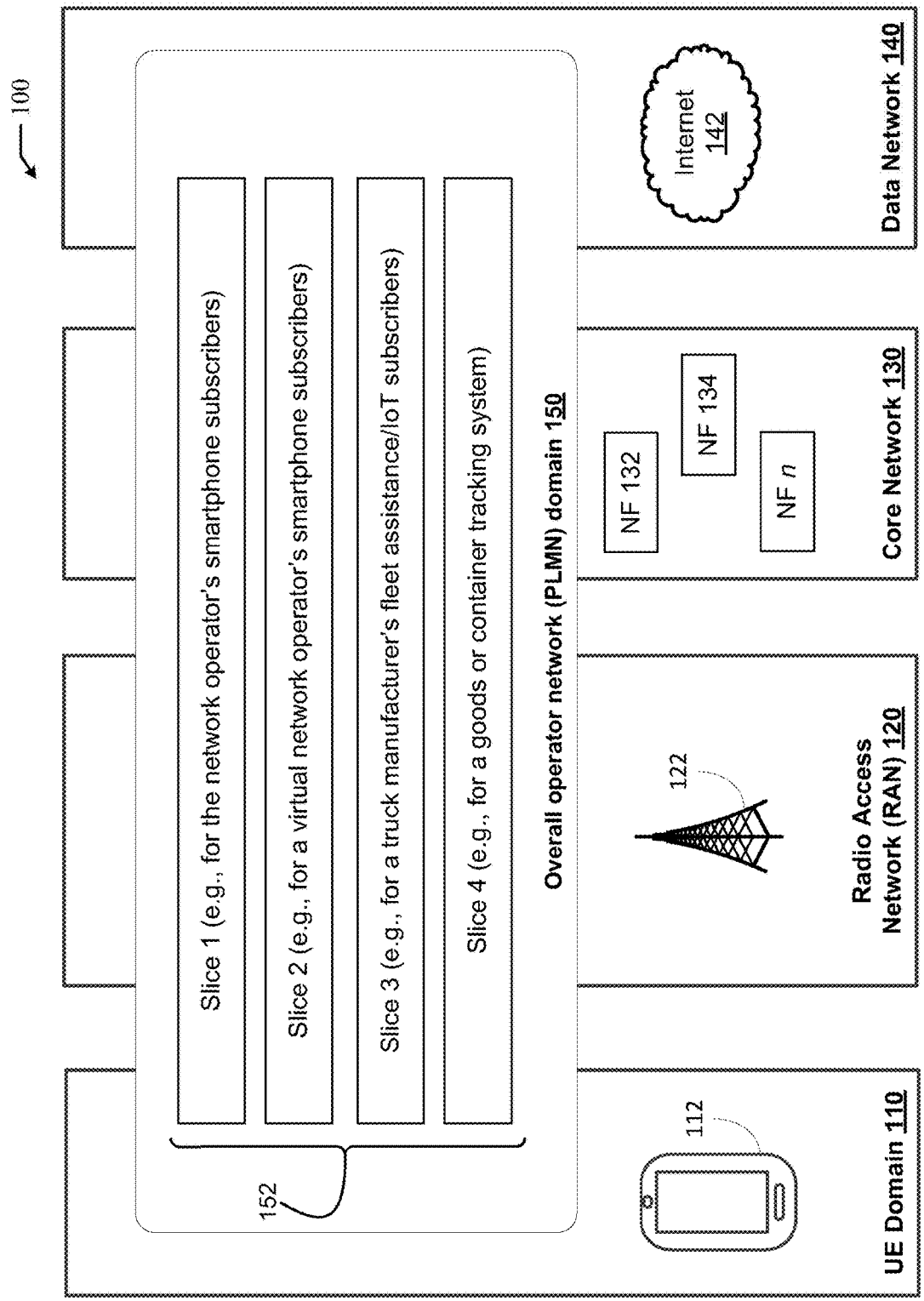
FIG. 1A depicts an example schematic representation of a 5G network environment in which network slicing has been implemented in accordance with some aspects of the disclosed technology.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described to avoid obscuring the description. References to one or an embodiment in the present disclosure can be references to the same embodiment or any embodiment; and, such references mean at least one of the embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described, which may be exhibited by some embodiments and not by others.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only and is not intended to further limit the scope and meaning of the disclosure or any example term. Likewise, the disclosure is not limited to various embodiments given in this specification.

Without intent to limit the scope of the disclosure, examples of instruments, apparatus, methods, and their related results according to the embodiments of the present disclosure are given below. Note that titles or subtitles may be used in the examples for the convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or can be learned by practice of the herein disclosed principles. The features and advantages of the disclosure can be realized and obtained using the instruments and combinations particularly pointed out in the appended claims. These and other features of the disclosure will become more fully apparent from the following description and appended claims or can be learned by the practice of the principles set forth herein.

Overview

In one example, a method is provided for avoiding context transfers by a first AMF connected to a first gNB to a second AMF when a user equipment (UE) in idle mode moves from the first gNB to a second gNB. The method may include provisioning the first AMF and the second AMF with the same tracking area identity (TAI), the first AMF and the second AMF being connected to a respective enterprise gNB. The method may also include configuring the 5G packet core network comprising a session management function (SMF) in communications with the first AMF and the second AMF, to avoid transferring a UE context from the first AMF to the second AMF when the user equipment (UE) in the idle mode moves from a first AMF to the second AMF, whereby the UE context remains with the first AMF.

In another example, a system is provided that includes a storage device (e.g., a memory configured to store data, such as virtual content data, one or more images, etc.) and one or more processors (e.g., implemented in circuitry) coupled to the memory and configured to execute instructions. The instructions are effective to cause the processor to provision the first AMF and the second AMF with the same tracking area identity (TAI). The first AMF and the second AMF are connected to a respective enterprise gNB. The instruction are effective to cause the processor to configure the 5G packet core network to avoid transfer of a UE context from the first AMF to the second AMF when the user equipment (UE) in the idle mode moves from a first AMF to the second AMF, whereby the UE context remains with the first AMF.

Example Embodiments

The disclosed technology addresses a need to optimize user equipment (UE) idle mode mobility handling in packet-core in a private 5G network, which is also referred to as a 5G packet core network. In an Enterprise private 5G network, there can be many mobility events due to reasons, such as small cell size or small footprint of AMF, among others. These mobility events lead to many signaling and processing overheads in the network.

In the Enterprise private 5G network with multiple AMFs, a UE in an idle mode normally performs a Mobility Registration procedure when the UE moves across AMFs. As part of the Mobility Registration procedure, the UE context from a previous AMF is transferred to a new AMF to which the UE has moved. However, the transfer of the UE context is unnecessary if the UE stays in the new AMF for a short period of time and the UE does not change to a connected mode from the idle mode. For example, if the UE in an idle mode rapidly moves across many AMFs, the transfer of the UE context can be avoided.

The disclosure provides a method that can be more efficient in the idle mode mobility handling in the 5G network. In particular, the disclosure provides a scheme of avoiding the transfer of UE context during idle mode mobility across many AMFs'. The transfer of the UE context doesn't happen unless required. This scheme results in significant reductions in signaling and processing.

Figure 1B:
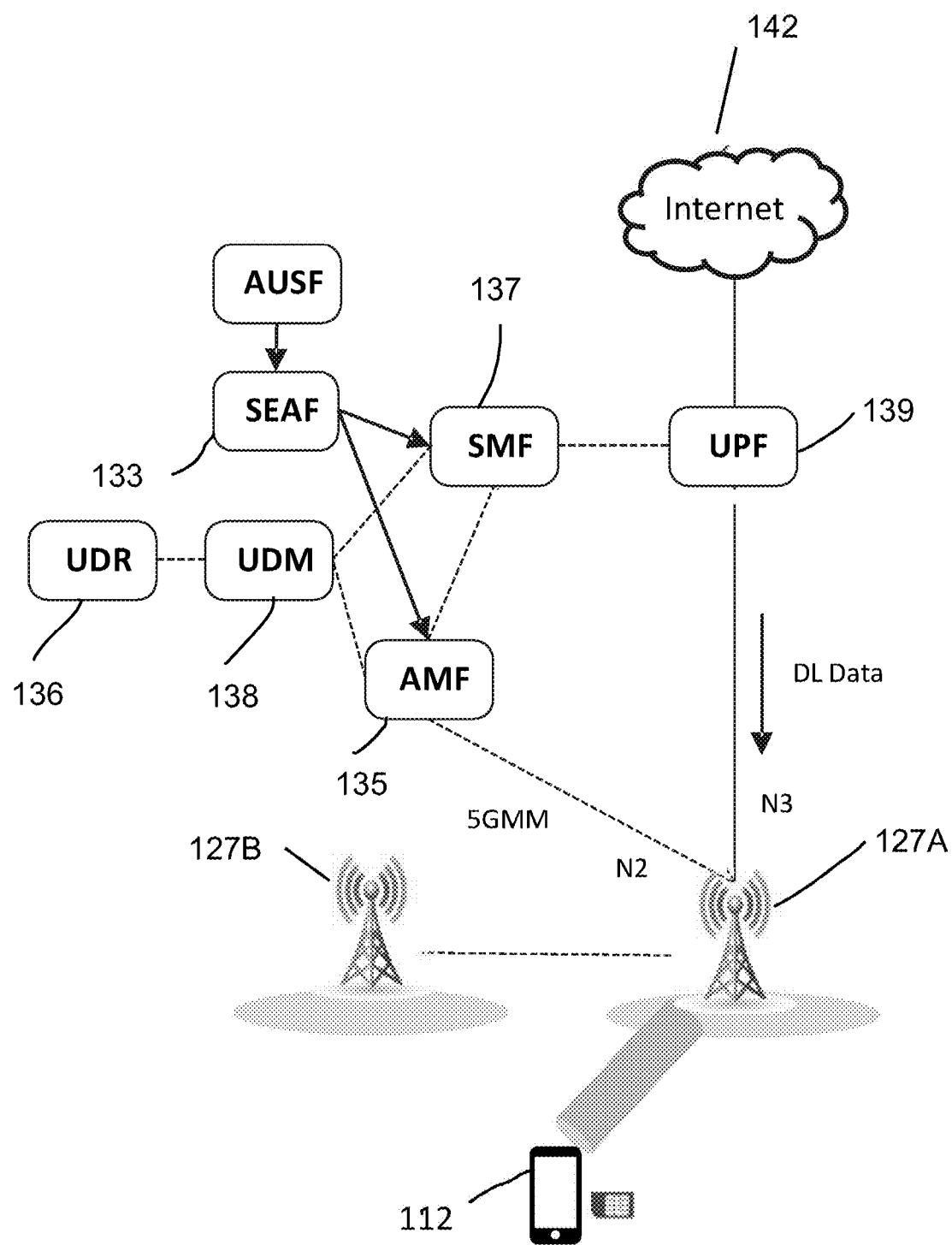
FIG. 1B illustrates an example 5G network architecture in accordance with some aspects of the present technology.
Figure 9A:
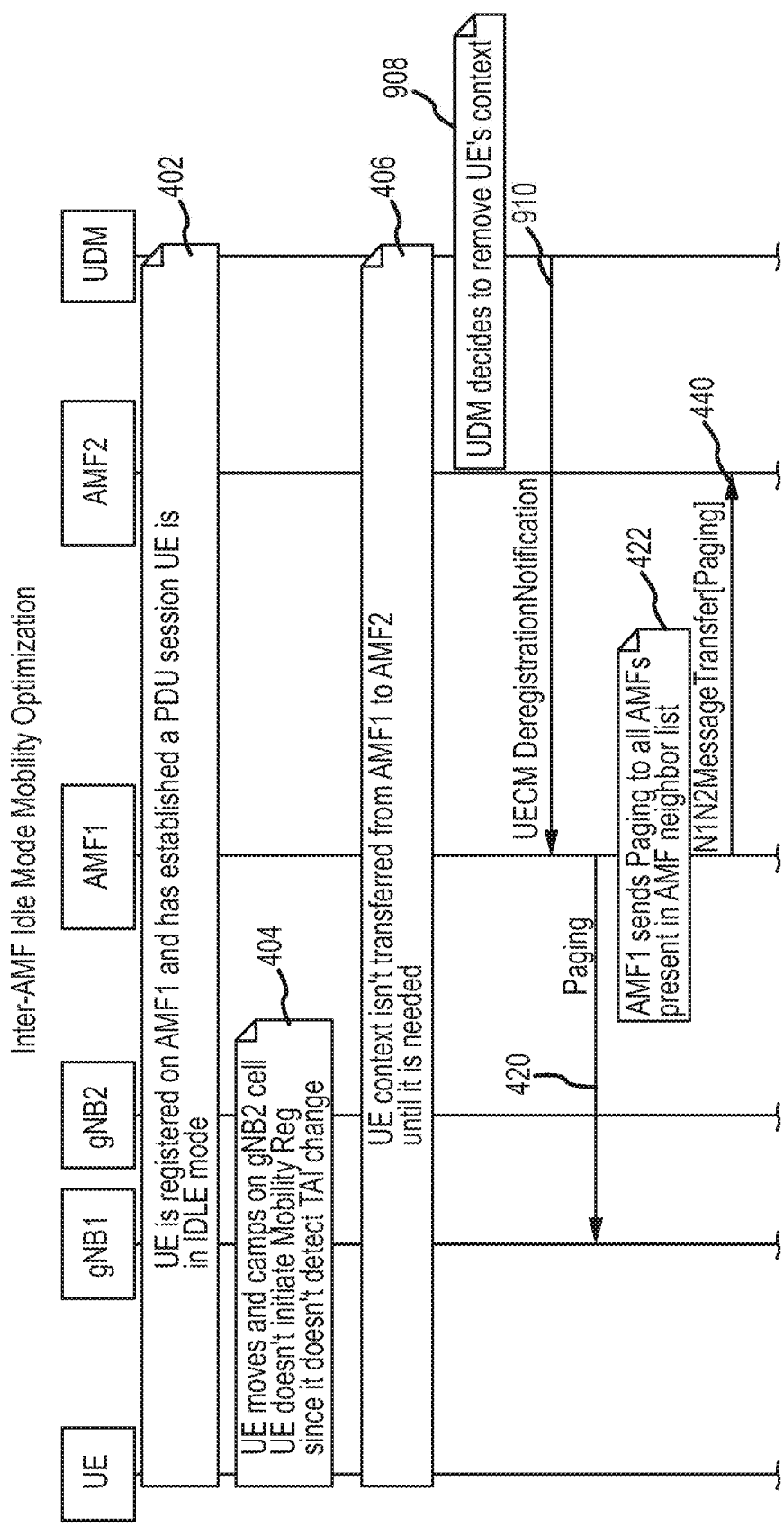
FIG. 9A is the first part of a sequence diagram depicting operations for UE deregistration in accordance with some aspects of the disclosed technology.
Figure 9B:
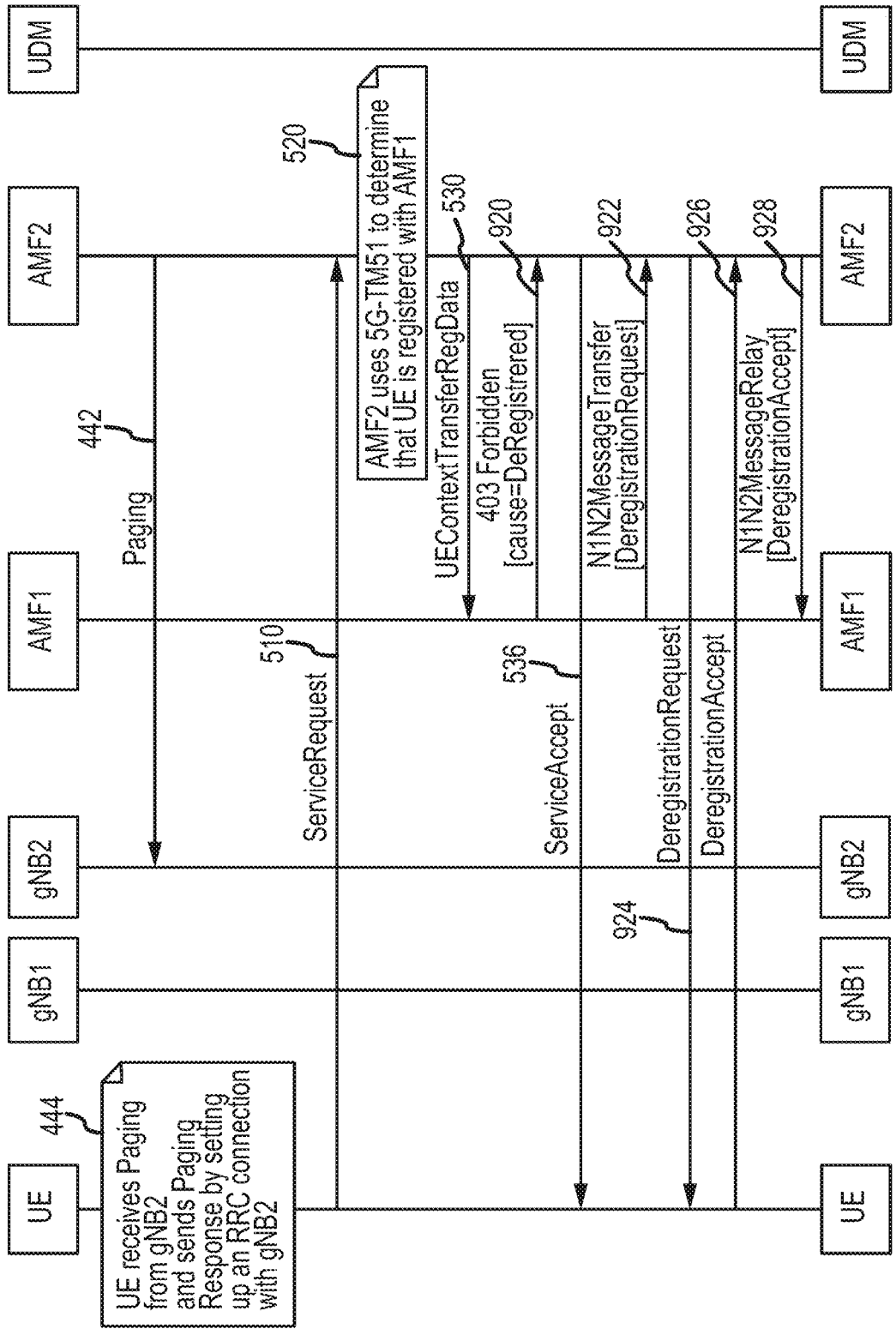
FIG. 9B is a second part of the sequence diagram depicting operations for UE deregistration in accordance with some aspects of the disclosed technology.
Figure 10:
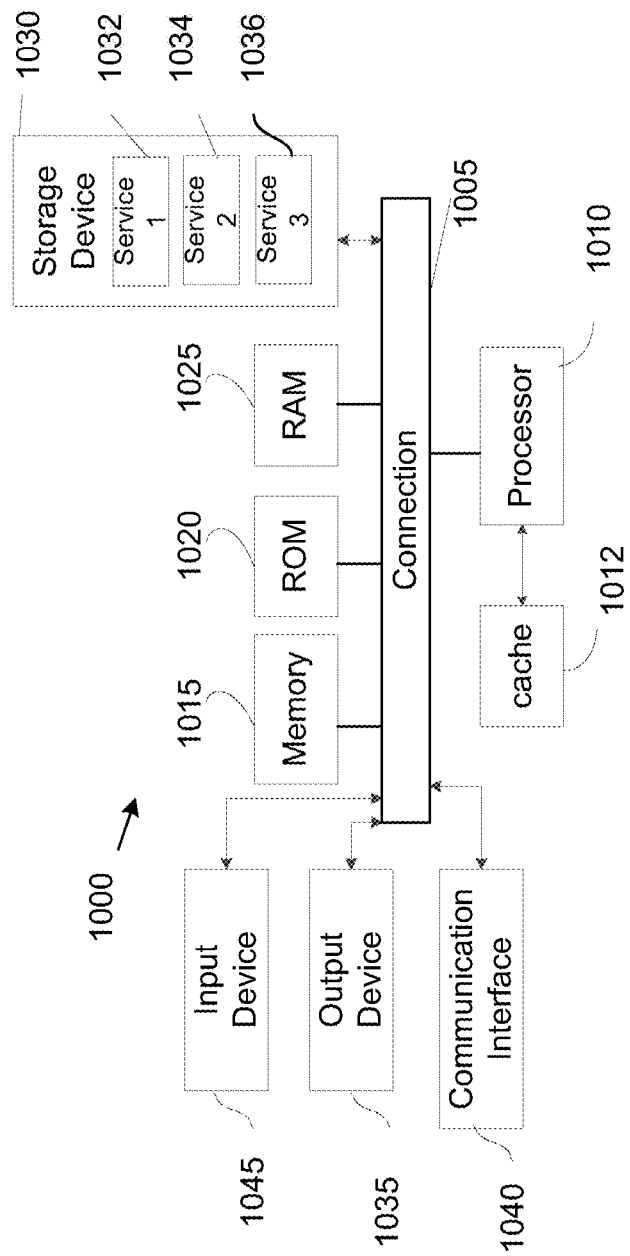
FIG. 10 shows an example of computing system 1000 in accordance with some aspects of the disclosed technology.

Descriptions of network environments and architectures for network data access and services, as illustrated in FIGS. 1A and 1B are first disclosed herein. A discussion of systems, methods, and computer-readable medium for the inter AMF idle mode mobility optimization, as shown in FIGS. 2-9 will then follow. The discussion then concludes with a brief description of example devices, as illustrated in FIG. 10. These variations shall be described herein as the various embodiments are set forth. The disclosure now turns to FIG. 1A.

FIG. 1A depicts an exemplary schematic representation of a 5G network environment in which network slicing has been implemented, and in which one or more aspects of the present disclosure may operate, according to some aspects of the present disclosure.

As illustrated, network environment 100 is divided into four domains, each of which will be explained in greater depth below; a User Equipment (UE) domain 110, e.g. of one or more enterprises, in which a plurality of user cellphones or other connected devices 112 reside; a Radio Access Network (RAN) domain 120, in which a plurality of radio cells, base stations, towers, or other radio infrastructure 122 resides; a Core Network 130, in which a plurality of Network Functions (NFs) 132, 134, . . . , n reside; and a Data Network 140, in which one or more data communication networks such as the Internet 142 reside. Additionally, the Data Network 140 can support SaaS providers configured to provide SaaSs to enterprises, e.g. to users in the UE domain 110.

Core Network 130 contains a plurality of Network Functions (NFs), shown here as NF 132, NF 134 . . . NF n. In some example embodiments, a core network 130 is a 5G core network (5GC) in accordance with one or more accepted 5GC architectures or designs. In some example embodiments, the core network 130 is an Evolved Packet Core (EPC) network, which combines aspects of the 5GC with existing 4G networks. Regardless of the particular design of core network 130, the plurality of NFs typically executes in a control plane of the core network 130, providing a service-based architecture in which a given NF allows any other authorized NFs to access its services. For example, a Session Management Function (SMF) controls session establishment, modification, release, etc., and in the course of doing so, provides other NFs with access to these constituent SMF services.

In some example embodiments, the plurality of NFs of the core network 130 can include one or more Access and Mobility Management Functions (AMF), typically used when core network 130 is a 5GC network) and Mobility Management Entities (MME), typically used when core network 130 is an EPC network), collectively referred to herein as an AMF/MME for purposes of simplicity and clarity. In some example embodiments, an AMF/MME can be common to or otherwise shared by multiple slices of the plurality of network slices 152, and in some example embodiments an AMF/MME can be unique to a single one of the plurality of network slices 152.

Similarly, the remaining NFs of the core network 130 can be shared amongst one or more network slices or provided as a unique instance specific to a single one of the plurality of network slices 152. In addition to NFs including an AMF/MME as discussed above, the plurality of NFs of the core network 130 can include one or more of the following: User Plane Functions (UPFs); Policy Control Functions (PCFs); Authentication Server Functions (AUSFs); Unified Data Management functions (UDMs); Application Functions (AFs); Network Exposure Functions (NEFs); NF Repository Functions (NRFs); and Network Slice Selection Functions (NSSFs). Various other NFs can be provided without departing from the scope of the present disclosure, as would be appreciated by one of ordinary skill in the art.

Across the four domains of the 5G network environment 100, an overall operator network domain 150 is defined. The operator network domain 150 is in some example embodiments a Public Land Mobile Network (PLMN), a private 5G network and/or a 5G enterprise network, and can be thought of as the carrier or business entity that provides cellular service to the end-users in UE domain 110. Within the operator network domain 150, a plurality of network slices 152 are created, defined, or otherwise provisioned to deliver the desired set of defined features and functionalities, e.g. SaaSs, for a certain use case or corresponding to other requirements or specifications. Note that network slicing for the plurality of network slices 152 is implemented in an end-to-end fashion, spanning multiple disparate technical and administrative domains, including management and orchestration planes (not shown). In other words, network slicing is performed from at least the enterprise or subscriber edge at UE domain 110, through the Radio Access Network (RAN) 120, through the 5G access edge and the 5G core network 130, and to the data network 140. Moreover, note that this network slicing may span multiple different 5G providers.

For example, as shown here, the plurality of network slices 152 include Slice 1, which corresponds to smartphone subscribers of the 5G provider who also operates network domain, and Slice 2, which corresponds to smartphone subscribers of a virtual 5G provider leasing capacity from the actual operator of network domain 150. Also shown is Slice 3, which can be provided for a fleet of connected vehicles, and Slice 4, which can be provided for an IoT goods or container tracking system across a factory network or supply chain. Note that the network slices 152 are provided for purposes of illustration, and in accordance with the present disclosure, and the operator network domain 150 can implement any number of network slices as needed, and can implement these network slices for purposes, use cases, or subsets of users and user equipment in addition to those listed above. Specifically, the operator network domain 150 can implement any number of network slices for provisioning SaaSs from SaaS providers to one or more enterprises.

5G mobile and wireless networks will provide enhanced mobile broadband communications and are intended to deliver a wider range of services and applications as compared to all prior generation mobile and wireless networks. Compared to prior generations of mobile and wireless networks, the 5G architecture is service-based, meaning that wherever suitable, architecture elements are defined as network functions that offer their services to other network functions via common framework interfaces. To support this wide range of services and network functions across an ever-growing base of user equipment (UE), 5G networks incorporate the network slicing concept utilized in previous generation architectures.

Within the scope of the 5G mobile and wireless network architecture, a network slice comprises a set of defined features and functionalities that together form a complete Public Land Mobile Network (PLMN), a private 5G network and/or a 5G enterprise network for providing services to UEs. This network slicing permits for the controlled composition of the 5G network with the specific network functions and provided services that are required for a specific usage scenario. In other words, network slicing enables a 5G network operator to deploy multiple, independent 5G networks where each is customized by instantiating only those features, capabilities, and services required to satisfy a given subset of the UEs or a related business customer needs.

In particular, network slicing is expected to play a critical role in 5G networks because of the multitude of use cases and new services 5G is capable of supporting. Network service provisioning through network slices is typically initiated when an enterprise requests network slices when registering with AMF/MME for a 5G network. At the time of registration, the enterprise will typically ask the AMF/MME for characteristics of network slices, such as slice bandwidth, slice latency, processing power, and slice resiliency associated with the network slices. These network slice characteristics can be used in ensuring that assigned network slices are capable of actually provisioning specific services, e.g. based on requirements of the services, to the enterprise.

Associating SaaSs and SaaS providers with network slices used to provide the SaaSs to enterprises can facilitate efficient management of SaaS provisioning to the enterprises. Specifically, it is desirable for an enterprise/subscriber to associate already procured SaaSs and SaaS providers with network slices being used to provision the SaaSs to the enterprise. However, associating SaaSs and SaaS providers with network slices is extremely difficult to achieve without federation across enterprises, network service providers, e.g. 5G service providers, and SaaS providers.

FIG. 1B illustrates an example 5G network architecture. As addressed above, a User Equipment (UE) 112 can connect to a radio access network provided by a first gNodeB (gNB) 127A or a second gNB 127B.

The gNB 127A can communicate over a control plane N2 interface with an access mobility function (AMF) 135. AMF 135 can handle tasks related to network access through communication with unified data management (UDM) function 138 which accesses a user data repository (URD) 136 that can contain user data such as profile information, authentication information, etc. Collectively AMF 135 and UDM 138 can determine whether a UE should have access and any parameters on access. AMF 135 also works with SEAF 133 to handle authentication and re-authentication of the UE 112 as it moves between access networks. The SEAF and the AMF could be separated or co-located.

Assuming AMF 135 determines the UE 112 should have access to a user plane to provide voice or data communications, AMF 135 can select one or more service management functions (SMF) 137. SMF 137 can configure and control one or more user plane functions (UPF) 139. Control plane communications between the SMF 137 and the gNB 127A (or 127B) also need to be encrypted. SEAF 133 can provide a security key to SMF 137 for use in encrypting control plane communications between the SMF 137 and the gNB 127A (or 127B).

As noted above SMF 137 can configure and control one or more user plane functions (UPF) 139. SMF 137 communicates with UPF 139 over an N4 Interface which is a bridge between the control plane and the user plane. SMF 137 can send PDU session management and traffic steering and policy rules to UPF 139 over the N4 interface. UPF 139 can send PDU usage and event reporting to SMF 137 over the N4 interface.

UPF 139 can communicate user plane data or voice over the N3 interface back to UE 112 through gNB 127A. There can be any number of UPFs handling different user plane services. Most commonly there would be at least one UPF for data service and at least one UPF for voice service.

By implementing UPF at each gNB, many UPF instances are in a single deployment, which complicates the UE IP address management and user plane data forwarding. Typically, a UE IP address pool is maintained by SMF, which allocates an IP address to a UE during UE Registration/PDU (Protocol Data Unit) session establishment process. SMF then configures UPF with traffic classification rules and traffic policies for the IP address. UPF acts as a router for the subnet allocated to the UE. IGP/BGP protocols can be used to publish these routes into the network. When the traffic for the UE is received from the network, the traffic is classified and the IP payload alone is forwarded to the gNB where the UE is connected over a GTPu tunnel. Similarly, when data are received in an uplink over the GTPu tunnel, UPF appends a MAC header and routes the data to the next hop. In the context of local UPF collocated at a gNB, maintaining one UE IP address pool per gNB will not be scalable and manageable as multiple gNBs exist in a facility. Routing/Packet forwarding would have similar implications.

Figure 2:
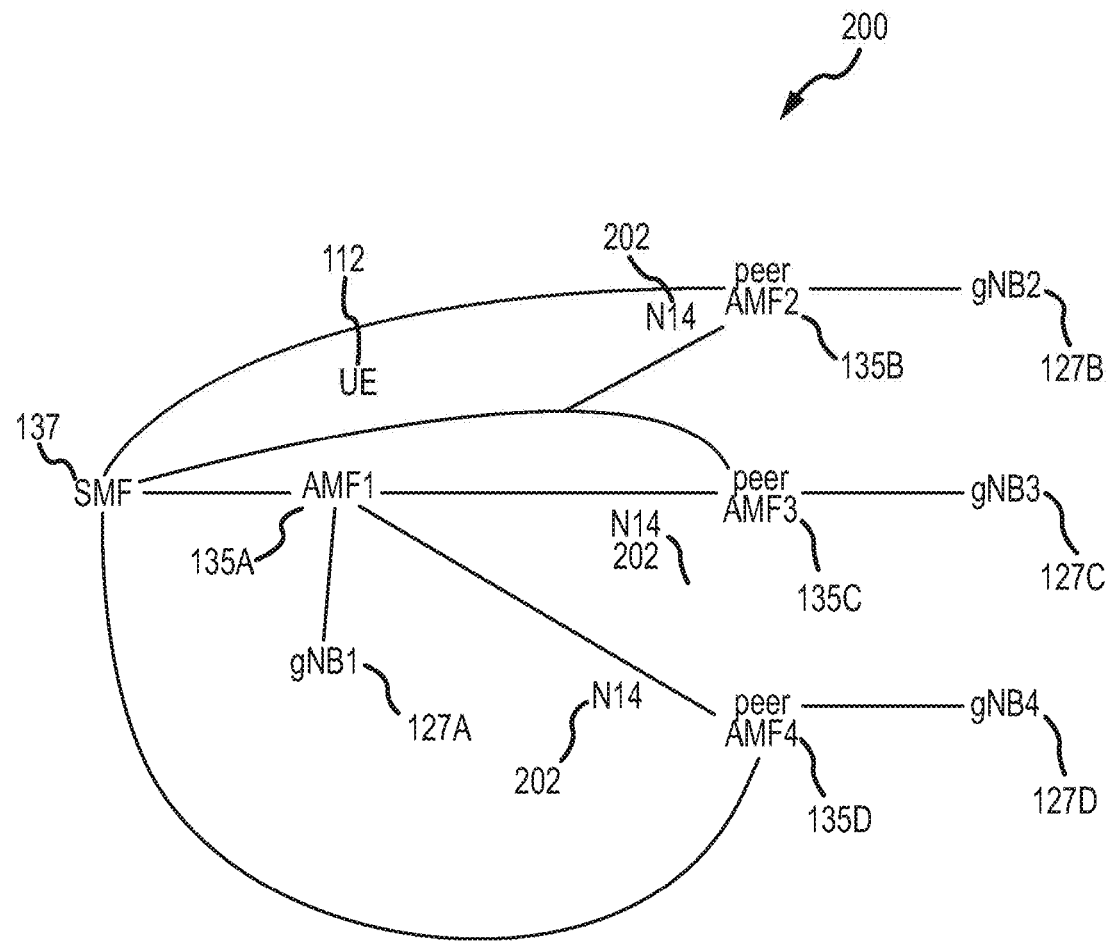
FIG. 2 illustrates an example 5G network architecture including multiple Access and Mobility Management functions (AMF) in accordance with some aspects of the disclosed technology.

FIG. 2 illustrates an example 5G network architecture including multiple AMFs in accordance with some aspects of the disclosed technology. As shown, a 5G core network 200 includes multiple AMFs 135A-D with an N14 interface 202 between the AMFs. For example, the N14 interface is between AMF1 and peer AMFs, e.g., AMF2, AMF3, AMF4, among others. The multiple AMFs are in communication with the same SMF 137. The multiple AMFs 135A-D are connected to respective gNBs 127A-D.

The gNBs 127A-D connected to the AMFs 135A-D participating in the idle mode mobility optimization can be configured with the same TAI. The same TAI configuration ensures that when the UE 112 moves from one gNB to another gNB connected to a different AMF, the UE does not perform a Mobility Registration procedure, which includes the transfer of the UE context from one AMF to another AMF. Typically, when a UE moves to a new TAI, it will perform a mobility registration which requires a context transfer to the AMF associated with the gNB. However, in the present technology, gNB1 is connected to AMF1 and gNB2 is connected to AMF2, and both gNB1 and gNB2 are configured with the same TAI so the UE will not need to perform mobility registration since it will not have moved to a new TAI, although it will have moved from gNB1 to gNB2. When the UE moves from gNB1 to gNB2 in an idle mode, there is no change detected in any TAI. Thus, the UE does not perform the Mobility Registration procedure.

Figure 3:
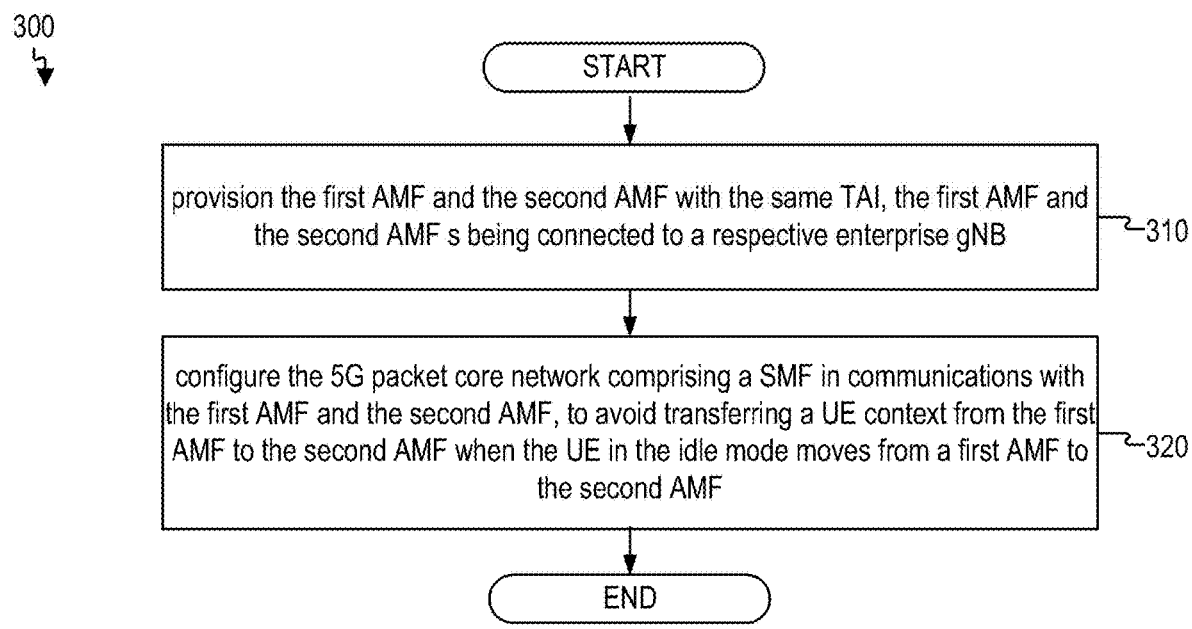
FIG. 3 illustrates an example method for avoiding user equipment (UE) context transfers by a first gNB connected to a first AMF to a second AMF when the UE in idle mode moves from the first gNB to a second gNB in accordance with some aspects of the disclosed technology.

FIG. 3 illustrates an example method 300 for avoiding UE context transfers when a user equipment (UE) in idle mode moves from the first gNB to a second gNB. Although example method 300 depicts a particular sequence of operations, the sequence may be altered without departing from the scope of the present disclosure. For example, some of the operations depicted may be performed in parallel or in a different sequence that does not materially affect the function of method 300. In other examples, different components of an example device or system that implements the method 300 may perform functions at substantially the same time or in a specific sequence.

According to some examples, method 300 includes provisioning the first AMF and the second AMF with the same tracking area identity (TAI), where the first AMF and the second AMF are connected to a respective enterprise gNB at block 310.

Since the first AMF and the second AMF are assigned to the same tracking area identity (TAI), the UE does not perform a Mobility Registration Procedure when the UE in idle mode moves from AMF1 to AMF2 or vice versa. Since the Mobility Registration does not occur, there is no transfer of the UE context from AMF1 to AMF2. Even though the UE is in connected to gNB2, which is which is associated with AMF2, the UE is still anchored at AMF1. Subsequently, if the UE moves back from gNB2 to gNB1, there is no Mobility Registration, and there is no transfer of the UE context. Reducing these unnecessary context transfers improves the efficiency of the network.

According to some examples, method 300 includes configuring the 5 G packet core network to avoid transferring a UE context from the first AMF to the second AMF when the user equipment (UE) in the idle mode moves from a first AMF to the second AMF, whereby the UE context remains with the first AMF at block 320.

The transfer of the UE context may happen when the UE connects to the network, e.g. when the UE exits an Idle Mode, when the UE sends a Service Request to the network due to UL data/signaling, or after receiving paging from the network. A particular AMF may use the TAI to AMF mapping to request peer-AMF nodes to send paging to their respective gNBs or RANs in the TAI. The TAI to AMF mapping may be configured locally on each AMF. The TAI to AMF mapping may also be discovered through AMF discovery using TAI.

When the network pages the UE, the paging goes to all gNBs serving the last registered TAI of the UE. These gNBs are connected to different AMFs, as illustrated in FIG. 2. The AMF uses the TAI to AMF mapping to determine the set of AMFs to which to send a paging request.

Figure 4:
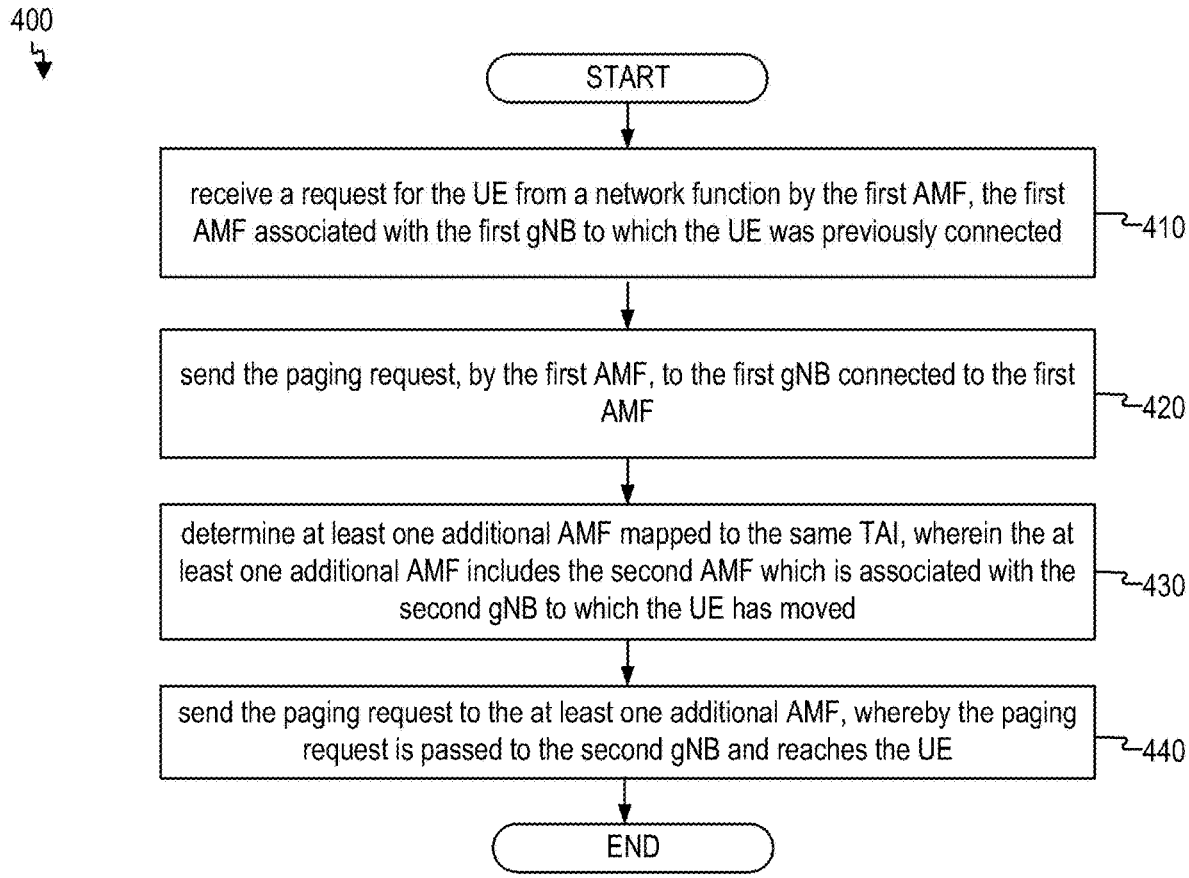
FIG. 4 illustrates an example method for paging in accordance with some aspects of the disclosed technology.

FIG. 4 illustrates an example method 400 for paging in accordance with some aspects of the disclosed technology. Although example method 400 depicts a particular sequence of operations, the sequence may be altered without departing from the scope of the present disclosure. For example, some of the operations depicted may be performed in parallel or in a different sequence that does not materially affect the function of method 400. In other examples, different components of an example device or system that implements the method 400 may perform functions at substantially the same time or in a specific sequence.

Figure 6A:
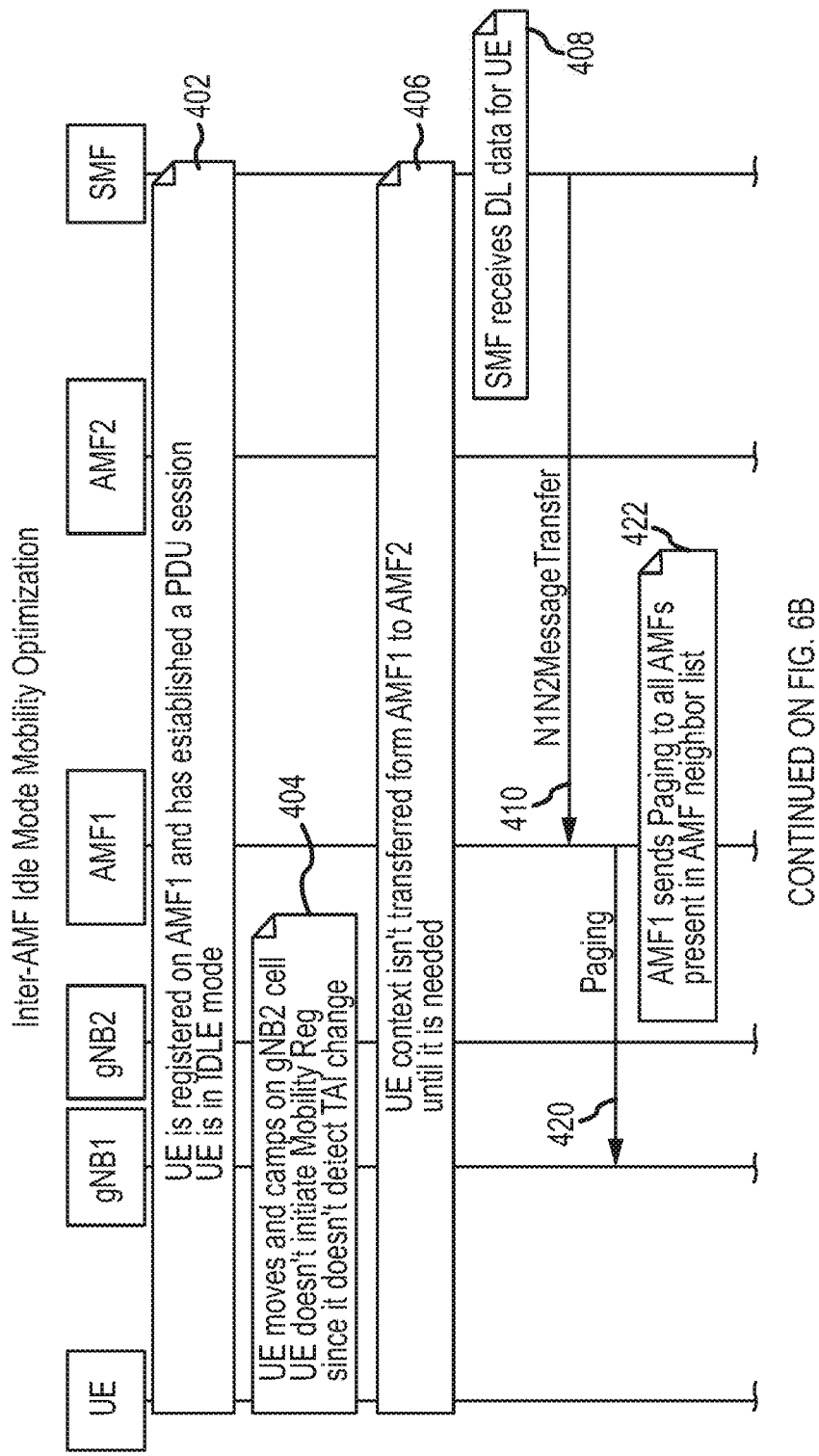
FIG. 6A is the first part of a sequence diagram depicting operations for paging and service request in accordance with some aspects of the disclosed technology.
Figure 6B:
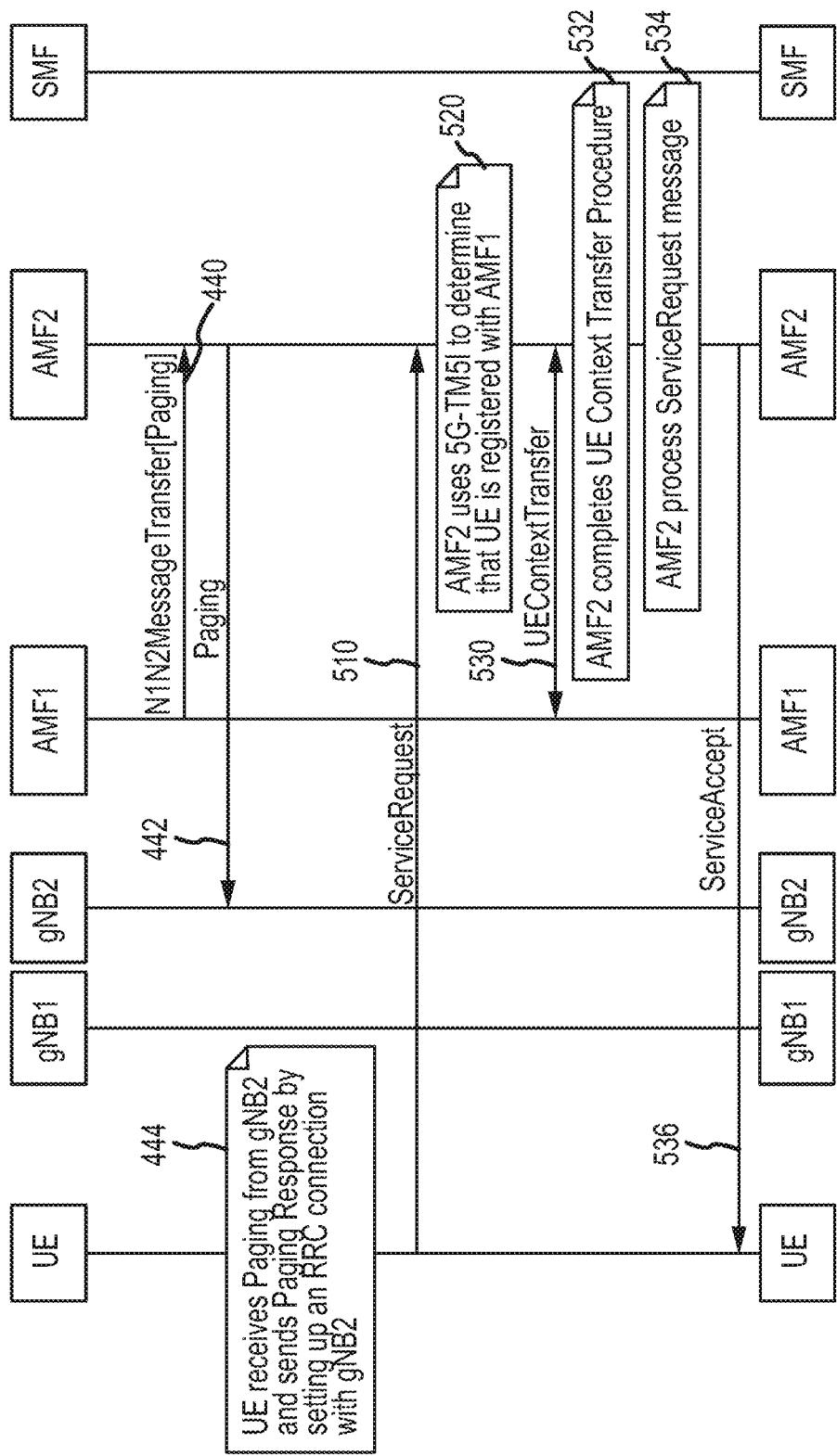
FIG. 6B is a second part of the sequence diagram depicting operations for paging and service request in accordance with some aspects of the disclosed technology.

Method 400 illustrated in FIG. 4 will also be discussed in the contexts of FIGS. 6A and 6B, which illustrate a sequence diagram for paging and service requests. Some steps specific to the present technology illustrated in method 400 are also present in FIGS. 6A and 6B.

As illustrated in FIG. 6A, UE is registered on AMF1 and has established a Protocol Data Unit (PDU) session, and the UE is in an idle mode at 402. The UE moves and connects to gNB2 where the UE remains in an Idle mode and does not initiate a Mobility Registration since the UE does not detect a TAI change at 404.

At 406, the UE context does not transfer from AMF1 to AMF2 until needed, which will occur if the UE emerges from an Idle mode and makes a registration request. At 408, SMF 137 receives downlink (DL) data for the UE. N1N2 If a network function (NF) intends to communicate with the UE, the NF sends a request to AMF1, e.g. on receiving DL data indication from UPF, and SMF 137 sends N1N2 Message Transfer to AMF1 at 410. According to some examples, method 400 includes receiving a paging request for the UE from a network function (NF) at block 410. For example, AMF1 as illustrated in FIG. 2 may receive a request for the UE from a network function, where AMF1 is associated with gNB1 to which the UE was previously connected. AMF1 receives a request for UE from some other network function. For example, SMF may send N1N2MessageTransfer signaling message to AMF1 when SMF receives Downlink data notification from UPF. AMF1 decides whether to send a Paging request to the UE, because the UE is in idle mode.

As illustrated in FIG. 6A, AMF1 sends a paging message to gNB1 at 420. According to some examples, method 400 includes sending the paging request to gNB1 connected to the AMF1 at block 420. As illustrated in FIG. 6A, AMF1 sends paging requests to all other AMFs in an AMF neighboring list at 422. The other AMFs are serving the same TAI.

According to some examples, method 400 includes determining at least one additional AMF mapped to the same TAI at block 430. For example, AMF1, as illustrated in FIG. 2, may determine at least one additional AMF mapped to the same TAI. The additional AMF includes the AMF2 which is associated with the gNB2 to which the UE has moved.

As illustrated in FIG. 6B, AMF2 receives a paging request from AMF1 at 440. According to some examples, method 400 includes sending the paging request to the at least one additional AMF, whereby the paging request is passed to gNB2 and reaches the UE at block 440. For example, AMF1 as illustrated in FIG. 2 may send the paging request to the at least one additional AMF, e.g. AMF2, whereby the paging request is passed to the second gNB and reaches the UE.

As illustrated in FIG. 6B, AMF2 sends paging to gNB2 at 442. The N14 interface is enhanced to support messages for this purpose. The UE receives the paging from gNB2 and sends a Paging Response by setting up a Radio Resource Control (RRC) correction with gNB2 at 444.

When a Service Request is received by a peer AMF (e.g. AMF2) where the UE' is not anchored, the peer AMF transfers the UE context from the AMF (AMF1) where the UE is anchored to AMF2.

Figure 5:
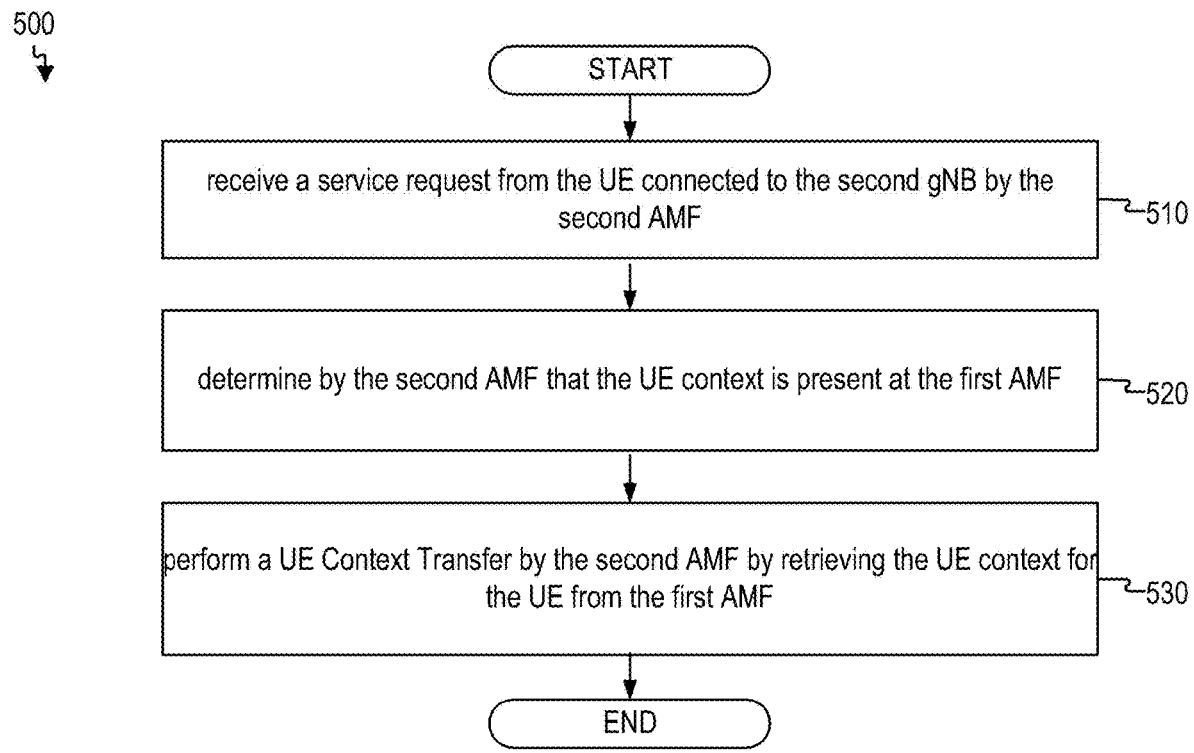
FIG. 5 illustrates an example method for handling a service request in accordance with some aspects of the disclosed technology.

FIG. 5 illustrates an example method 500 for handling service requests in accordance with some aspects of the disclosed technology. Although example method 500 depicts a particular sequence of operations, the sequence may be altered without departing from the scope of the present disclosure. For example, some of the operations depicted may be performed in parallel or in a different sequence that does not materially affect the function of method 500. In other examples, different components of an example device or system that implements the method 500 may perform functions at substantially the same time or in a specific sequence.

Method 500 illustrated in FIG. 5 will also be discussed in the context of FIGS. 6A and 6B, which illustrates a sequence diagram for paging and service request. Some steps specific to the present technology illustrated in method 500 are also present in FIGS. 6A and 6B.

As illustrated in FIG. 6B, the Service Request from the UE is received by AMF2 which 'does not have the UE context at 510. Since the UE is attached to gNB2, the UE receives paging from gNB2 and responds to the paging by sending the Service Request to AMF2 at 510. According to some examples, method 500 includes receiving a service request by the second AMF from the UE connected to the second gNB at block 510.

As illustrated in FIG. 6B, AMF2 uses 5G-TMSI to determine that the UE context is registered with AMF1 at 520. TMSI stands for Temporary Mobile Subscriber Identity, and is part of the 5G-GUTI, which is typically assigned to the UE during Initial Registration by AMF1. According to some examples, method 500 includes determining that the UE context is present at the first AMF at block 520. If the UE context is present at the first AMF, the UE is registered with the first AMF or AMF1.

As illustrated in FIG. 6B, AMF2 performs a 3GPP procedure "UEContextTransfer" to retrieve the UE context from AMF1 and complete the UE registration on AMF2 at 530. Once the UE is registered on AMF2, the Service Request can be processed regularly. According to some examples, method 500 includes performing a UE Context Transfer by retrieving the UE context for the UE from the first AMF at block 530. For example, AMF2 illustrated in FIG. 2 may perform a UE Context Transfer by retrieving the UE context for the UE from the first AMF.

As illustrated in FIG. 6B, AMF2 completes the transfer of the UE context at 532, processes a service request message at 534, then sends a Service Accept message to the UE at 536.

Figure 7:
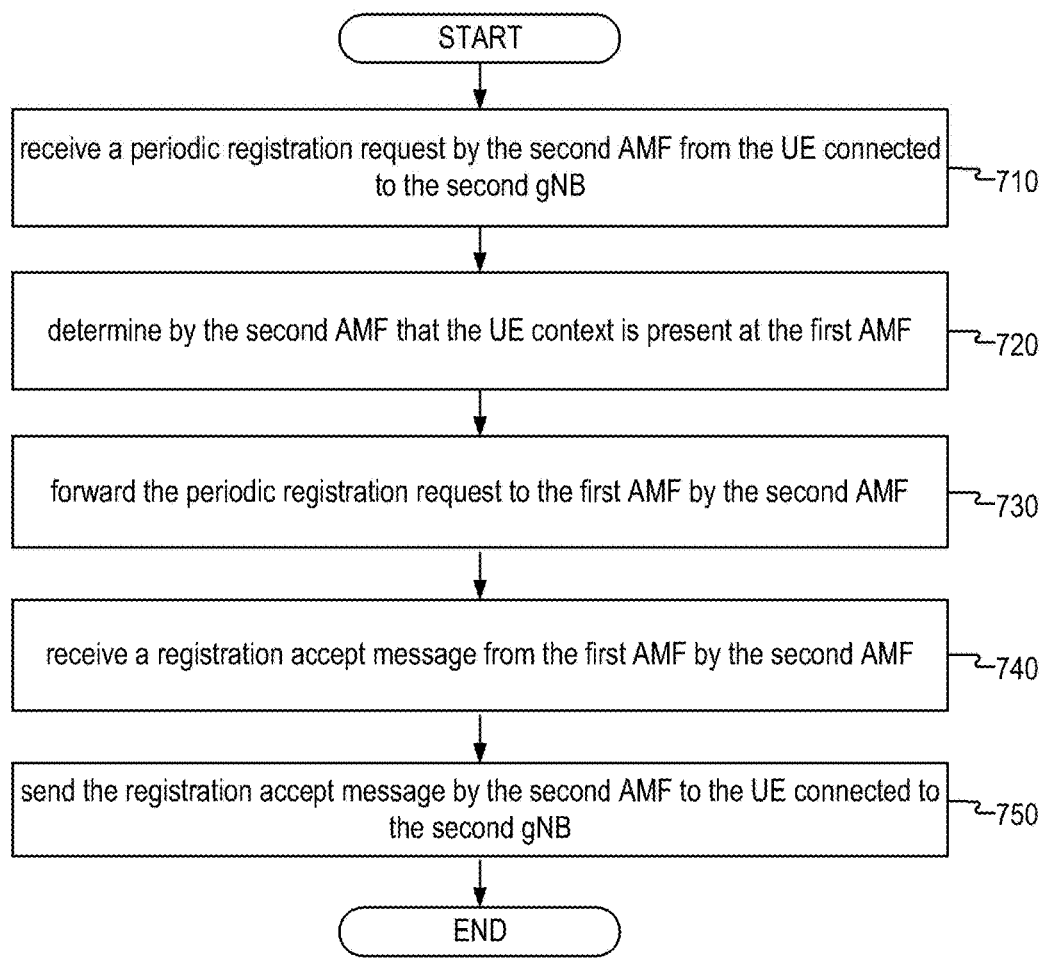
FIG. 7 illustrates an example method for handling periodic registration in accordance with some aspects of the disclosed technology.

There is no need to transfer the UE context if UE is performing a periodic registration. FIG. 7 illustrates an example method 700 for periodic registration in accordance with some aspects of the disclosed technology. Although example method 700 depicts a particular sequence of operations, the sequence may be altered without departing from the scope of the present disclosure. For example, some of the operations depicted may be performed in parallel or in a different sequence that does not materially affect the function of method 700. In other examples, different components of an example device or system that implements the method 700 may perform functions at substantially the same time or in a specific sequence.

Figure 8A:
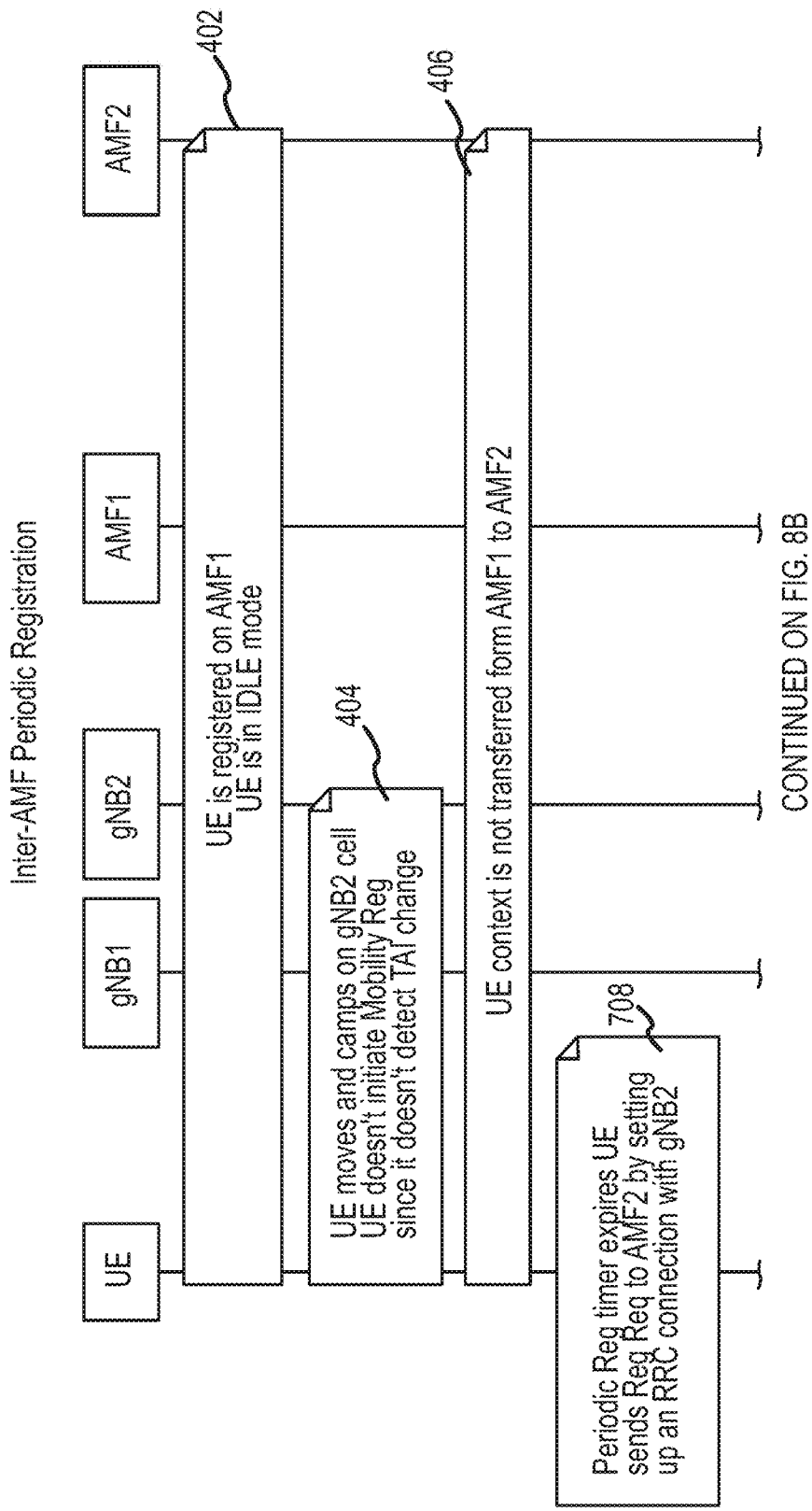
FIG. 8A is the first part of a sequence diagram depicting operations for handling periodic registration in accordance with some aspects of the disclosed technology.
Figure 8B:
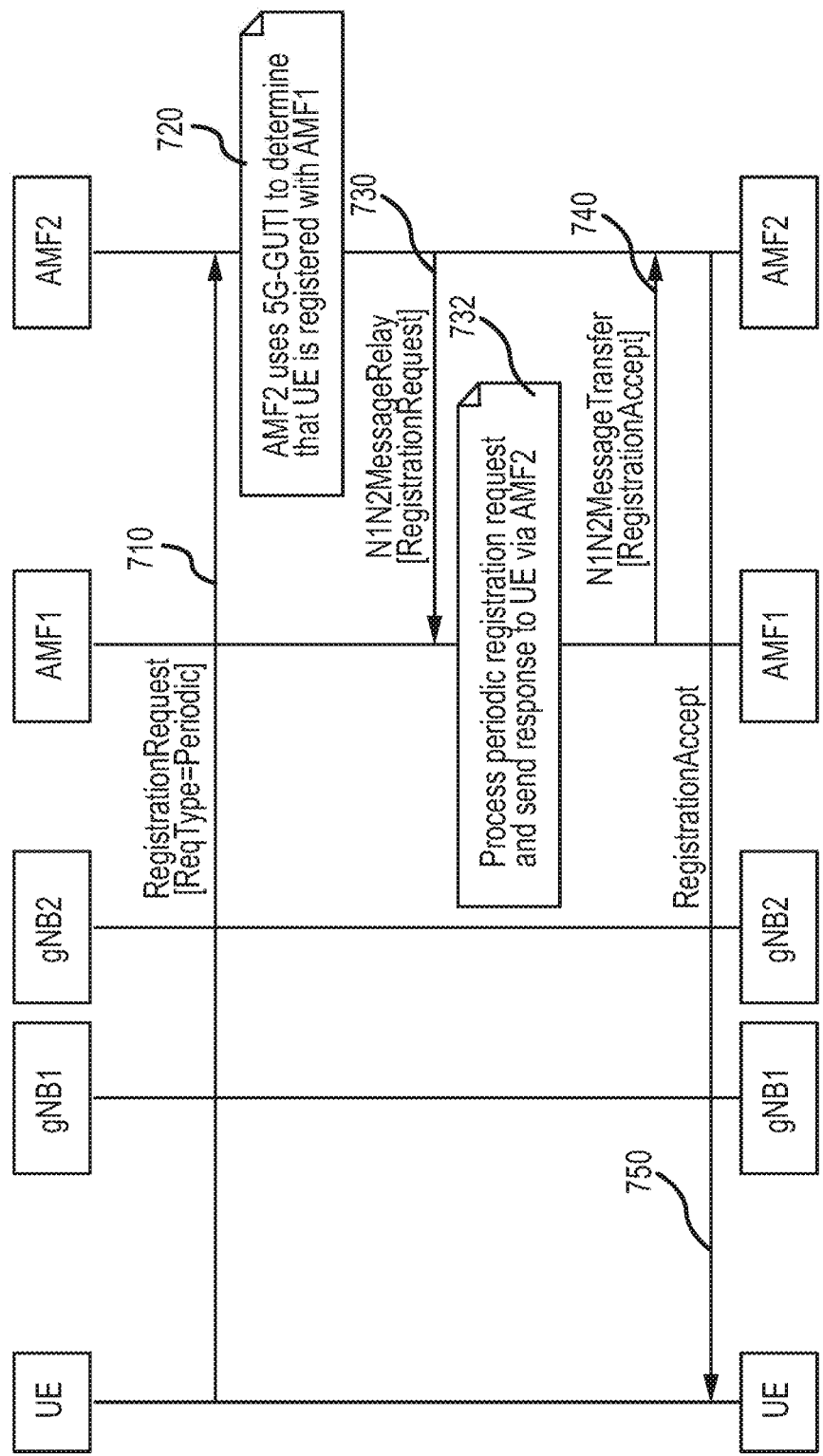
FIG. 8B is a second part of the sequence diagram depicting operations for handling periodic registration in accordance with some aspects of the disclosed technology.

Method 700 illustrated in FIG. 7 will also be discussed in the contexts of FIGS. 8A and 8B, which illustrate a sequence diagram for paging and service requests. Some steps specific to the present technology illustrated in method 700 are present in FIG. 7.

As illustrated in FIG. 8A, operations 402, 404, and 406 are described above with respect to FIG. 6A. A periodic registration timer expires at 708. The UE sends a periodic registration request to AMF2 by setting up an RRC connection with gNB2 at 710. According to some examples, method 700 includes receiving a periodic registration request from the UE connected to the second gNB at block 710. For example, AMF2 illustrated in FIG. 2 may receive a periodic registration request from the UE connected to the second gNB.

As illustrated in FIG. 8B, AMF2 uses 5G Global Unique Temporary Identifier (5G-GUTI) to determine that the UE is registered with AMF1 at 720. The Registration Request message carries 5G-GUTI. TMSI is a part of 5G-GUTI. In the disclosure, 5G-GUTI is used interchangeably with TMSI. According to some examples, method 700 includes determining that the UE context is present at the first AMF at block 720. For example, AMF2 illustrated in FIG. 2 may determine that the UE context is present at the first AMF (AMF1). If the UE context is present at the first AMF, the UE is registered with the first AMF or AMF1.

As illustrated in FIG. 8B, AMF2 forwards a Periodic Registration Request message (e.g. N1N2 Message Relay) to AMF1 over an N14 interface at 730. The N14 interface is enhanced to support this communication. According to some examples, method 700 includes forwarding the periodic registration request to the first AMF by the second AMF at block 730. At 732, AMF1 processes the Periodic Registration Request and sends a Registration Accept response to the UE via AMF2.

At 740, AMF1 sends a Registration Request (e.g. N1N2 Message Transfer) to AMF2. According to some examples, method 700 includes receiving a registration Accept message from the first AMF (AMF1) by the second AMF (AMF2) at block 740.

As illustrated in FIG. 8B, AMF2 sends a Registration Accept to the UE at 750. According to some examples, method 700 includes sending the registration accept message by the second AMF to the UE connected to the second gNB, whereby the UE context is not transferred when the UE sends the periodic registration request at block 750.

Unified data management (UDM) initiates UE deregistration, e.g. due to subscription being withdrawn. FIG. 9A is the first part of a sequence diagram depicting operations for UE deregistration in accordance with some aspects of the disclosed technology. FIG. 9B is a second part of the sequence diagram depicting operations for UE deregistration in accordance with some aspects of the disclosed technology.

At 908, UDM decides to remove the UE context. At 910, UDM sends Deregistration Request to AMF1. Then, AMF1 performs a paging procedure, including operations 420-444, as described above in FIGS. 6A and 6B.

The UE responds with a Service Request to AMF2 at 510. If the UE is in an AMF2 area, AMF2 receives a Service Request from the UE and sends a UE Context Transfer request to AMF1 at 530.

Since the UE is de-registered from the AMF1, AMF1 sends a failure response ""403 Forbidden"" and provides a cause code ""UE DEREGISTERED"" at 920. The cause code is added to the N14 interface.

At 536, AMF2 sends a Service Accept message to the UE. At 922, AMF1 sends a NAS message Deregistration Request (e.g. N1N2 Message Transfer) to AMF2. The Deregistration Request is transferred to the UE. At 924, AMF2 sends a Deregistration Request to the UE. At 926, the UE responds with Deregistration Accept. Then, AMF2 relays the Deregistration Request to AMF1.

In some aspects, configuring the 5G packet core network may include enhancing an N14 interface to support paging by the first AMF to the second AMF. To request other AMF nodes serving the same TAI to send paging to their RANs. The first AMF uses an N1N2 Message Transfer service to send paging to the second AMF (e.g. a peer AMF). The peer AMF or the second AMF sends paging to the gNB serving the same TAI.

The 5G packet core network may be configured by enhancing the N14 interface to relay a NAS message by the second AMF to the first AMF. To relay certain NAS messages (e.g. N1N2 Message Transfer) from one AMF to another AMF requires defining an additional service on the N14 interface.

The configuring the 5G packet core network may further include enhancing the N14 interface to trigger a UE Context transfer procedure by the second AMF (e.g. peer AMF2) after receiving a service request from the UE.

The configuring the 5G packet core network may further include enhancing an N14 interface to include ""5G-TM5I"" as ""UEContextID"" in N14 messages for UE identification and define a UE Deregistered cause code.

FIG. 10 shows an example of computing system 1000, which can be for example any computing device making up any of the entities illustrated in FIG. 2, for example, gNBs 127A-D, or any component thereof in which the components of the system are in communication with each other using connection 1005. Connection 1005 can be a physical connection via a bus, or a direct connection into processor 1010, such as in a chipset architecture. Connection 1005 can also be a virtual, networked connection, or logical connection.

In some embodiments, computing system 1000 is a distributed system in which the functions described in this disclosure can be distributed within a data center, multiple data centers, a peer network, etc. In some embodiments, one or more of the described system components represents many such components each performing some or all of the function for which the component is described. In some embodiments, the components can be physical or virtual devices.

Example system 1000 includes at least one processing unit (CPU or processor) 1010 and connection 1005 that couples various system components including system memory 1015, such as read-only memory (ROM) 1020 and random access memory (RAM) 1025 to processor 1010. Computing system 1000 can include a cache of high-speed memory 1012 connected directly with, close to, or integrated as part of processor 1010.

Processor 1010 can include any general-purpose processor and a hardware service or software service, such as services 1032, 1034, and 1036 stored in storage device 1030, configured to control processor 1010 as well as a special-purpose processor where software instructions are incorporated into the actual processor design. Processor 1010 may essentially be a completely self-contained computing system, containing multiple cores or processors, a bus, memory controller, cache, etc. A multi-core processor may be symmetric or asymmetric.

To enable user interaction, computing system 1000 includes an input device 1045, which can represent any number of input mechanisms, such as a microphone for speech, a touch-sensitive screen for gesture or graphical input, keyboard, mouse, motion input, speech, etc. Computing system 1000 can also include output device 1035, which can be one or more of many output mechanisms known to those of skill in the art. In some instances, multimodal systems can enable a user to provide multiple types of input/output to communicate with computing system 1000. Computing system 1000 can include communications interface 740, which can generally govern and manage the user input and system output. There is no restriction on operating on any particular hardware arrangement, and therefore the basic features here may easily be substituted for improved hardware or firmware arrangements as they are developed.

Storage device 1030 can be a non-volatile memory device and can be a hard disk or other types of computer-readable media which can store data that are accessible by a computer, such as magnetic cassettes, flash memory cards, solid-state memory devices, digital versatile disks, cartridges, random access memories (RAMs), read-only memory (ROM), and/or some combination of these devices.

The storage device 1030 can include software services, servers, services, etc., that when the code that defines such software is executed by the processor 1010, it causes the system to perform a function. In some embodiments, a hardware service that performs a particular function can include the software component stored in a computer-readable medium in connection with the necessary hardware components, such as processor 1010, connection 1005, output device 1035, etc., to carry out the function.

For clarity of explanation, in some instances, the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in the memory of a client device and/or one or more servers of a content management system and perform one or more functions when a processor executes the software associated with the service. In some embodiments, a service is a program or a collection of programs that carry out a specific function. In some embodiments, a service can be considered a server. The memory can be a non-transitory computer-readable medium.

In some embodiments, the computer-readable storage devices, mediums, and memories can include a cable or wireless signal containing a bitstream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer-readable media. Such instructions can comprise, for example, instructions and data which cause or otherwise configure a general-purpose computer, special purpose computer, or special purpose processing device to perform a certain function or group of functions. Portions of computer resources used can be accessible over a network. The executable computer instructions may be, for example, binaries, intermediate format instructions such as assembly language, firmware, or source code. Examples of computer-readable media that may be used to store instructions, information used, and/or information created during methods according to described examples include magnetic or optical disks, solid-state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smartphones, small form factor personal computers, personal digital assistants, and so on. The functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

What is claimed is:

1. A method for avoiding context transfers by a first Access and Mobility Management Function (AMF) connected to a first gNB to a second AMF when a user equipment (UE) in idle mode moves from the first gNB to a second gNB, the method comprising:

provisioning the first AMF and the second AMF with the same tracking area identity (TAI), the first AMF and the second AMF s being connected to a respective enterprise gNB; and configuring the 5G packet core network comprising a session management function (SMF) in communications with the first AMF and the second AMF, to avoid transferring a UE context from the first AMF to the second AMF when the user equipment (UE) in the idle mode moves from a first AMF to the second AMF, whereby the UE context remains with the first AMF.

2. The method of claim 1, whereby since the first AMF and the second AMF are assigned to the same tracking area identity (TAI), the UE does not perform a Mobility Registration Procedure.

3. The method of claim 1, further comprising:
receiving a request for the UE from a network function by the first AMF, the first AMF associated with the first gNB to which the UE was previously connected;
sending a paging request, by the first AMF, to the first gNB connected to the first AMF;
determining at least one additional AMF mapped to the same tracking area identity (TAI), wherein the at least one additional AMF includes the second AMF which is associated with the second gNB to which the UE has moved; and
sending the paging request to the at least one additional AMF, whereby the paging request is passed to the second gNB and reaches the UE.

4. The method of claim 3, wherein the paging request sent to the at least one additional AMF is transmitted over an N14 interface.

5. The method of claim 1, further comprising:
receiving a periodic registration request by the second AMF from the UE connected to the second gNB;
determining by the second AMF that the UE context is present at the first AMF;
forwarding the periodic registration request to the first AMF by the second AMF; and
receiving a registration accept message from the first AMF by the second AMF, wherein the registration request message is the result of the first AMF having processed the periodic registration request,
wherein the second AMF sends the registration accept message to the UE connected to the second gNB, whereby the UE context is not transferred when the UE sends the periodic registration request.

6. The method of claim 5, wherein the forwarding the periodic registration request to the first AMF occurs over an N14 interface.

7. The method of claim 1, further comprising initiating the UE to deregister the first AMF by a Unified Data Management (UDM).

8. The method of claim 1, wherein the UE context is transferred, by the first AMF, to the second AMF when a service request is received by the second AMF.

9. The method of claim 1, further comprising:
receiving a service request from the UE connected to the second gNB by the second AMF;
determining by the second AMF that the UE context is present at the first AMF;
performing a UE Context Transfer by the second AMF by retrieving the UE context for the UE from the first AMF.

10. The method of claim 9, wherein the performing a UE Context Transfer by the second AMF utilizes an N14 interface between the second AMF and the first AMF.

11. The method of claim 9, further comprising:
when the first AMF has previously received a UE deregistration request, responding to the UE Context Transfer with a failure response indicating the UE has been deregistered.

12. The method of claim 11, wherein the failure response indicating the UE has been deregistered is sent over an N14 interface.

13. The method of claim 2, wherein the configuring the 5G packet core network further comprises enhancing an N14 interface to support a paging message by the first AMF to the second AMF.

14. The method of claim 2, the configuring the 5G packet core network further comprises enhancing an N14 interface to relay a non-access stratum (NAS) message by the second AMF to the first AMF; and to trigger a UE Context transfer procedure after receiving a service request by the second AMF from the UE.

15. A system comprising:
a storage device configured to store instructions;
a processor configured to execute the instructions and cause the processor to:
provision the first AMF and the second AMF with the same tracking area identity (TAI), the first AMF and the second AMF being connected to a respective enterprise gNB, and
configure the 5G packet core network comprising a session management function (SMF) in communications with the first AMF and the second AMF, to avoid transfer a UE context from the first AMF to the second AMF when the user equipment (UE) in the idle mode moves from a first AMF to the second AMF, whereby the UE context remains with the first AMF.

16. The system of claim 15, wherein since the first AMF and the second AMF are assigned to the same tracking area identity (TAI), the UE does not perform a Mobility Registration Procedure.

17. The system of claim 15, wherein the processor is configured to execute the instructions and cause the processor to:
receive a request for the UE from a network function by the first AMF, the first AMF associated with the first gNB to which the UE was previously connected;
send a paging request, by the first AMF, to the first gNB connected to the first AMF;
determine at least one additional AMF mapped to the same tracking area identity (TAI), wherein the at least one additional AMF includes the second AMF which is associated with the second gNB to which the UE has moved; and
send the paging request to the at least one additional AMF, whereby the paging request is passed to the second gNB and reaches the UE.

18. The system of claim 15, wherein the processor is configured to execute the instructions and cause the processor to:
receive a periodic registration request by the second AMF from the UE connected to the second gNB;
determine by the second AMF that the UE context is present at the first AMF;
forward the periodic registration request to the first AMF by the second AMF; and
receive a registration accept message from the first AMF by the second AMF, wherein the registration request message is the result of the first AMF having processed the periodic registration request,
wherein the second AMF sends the registration accept message to the UE connected to the second gNB, whereby the UE context is not transferred when the UE sends the periodic registration request.

19. The system of claim 15, wherein the processor is configured to execute the instructions and cause the processor to: initiate the UE to deregister the first AMF by a Unified Data Management (UDM).

20. A non-transitory computer readable medium comprising instructions, the instructions, when executed by a computing system, cause the computing system to:
provision the first AMF and the second AMF with the same tracking area identity (TAI), the first AMF and the second AMF being connected to a respective enterprise gNB; and
configure the 5 G packet core network comprising a session management function (SMF) in communications with the first AMF and the second AMF, to avoid transfer a UE context from the first AMF to the second AMF when the user equipment (UE) in the idle mode moves from a first AMF to the second AMF, whereby the UE context remains with the first AMF.

* * * * *